United States Patent
Ohta et al.

[19]

[11] Patent Number: 5,917,790
[45] Date of Patent: *Jun. 29, 1999

[54] OPTICAL INFORMATION RECORDING/ REPRODUCING METHOD AND APPARATUS FOR PERFORMING AUTO-TRACKING CONTROL USING A THREE-BEAM METHOD, WITH RESPECT TO FIRST AND SECOND RECORDING MEDIA HAVING DIFFERENT TRACK PITCHES

[75] Inventors: Shinichi Ohta, Tokyo; Moritoshi Miyamoto, Kawasaki, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/870,833

[22] Filed: Jun. 6, 1997

Related U.S. Application Data

[63] Continuation of application No. 08/314,378, Sep. 28, 1994, abandoned.

[30] Foreign Application Priority Data

Sep. 30, 1993 [JP] Japan .................................. 5-265469

[51] Int. Cl.$^6$ ...................................................... G11B 7/09
[52] U.S. Cl. .................. 369/44.29; 235/454; 369/44.37; 369/58
[58] Field of Search ............................. 369/44.26, 44.27, 369/44.29, 44.37, 54, 58; 235/454, 456

[56] References Cited

U.S. PATENT DOCUMENTS 5,189,659 2/1993 Ohta ........................................ 369/109
5,235,583 8/1993 Jongenelis et al. ................... 369/44.26
5,561,643 10/1996 Yamazaki et al. ......................... 369/15

FOREIGN PATENT DOCUMENTS 0525896 2/1993 European Pat. Off. .

OTHER PUBLICATIONS

Patent Abstracts of Japan, Kokai No. 3-173980, vol. 15, No. 424, Oct. 1991.
Patent Abstracts of Japan, Kokai No. 63-66734, vol. 12, No. 290, Aug. 1988.
Patent Abstracts of Japan, Kokai No. 59-168939, vol. 9, No. 24, Jan. 1985.
Patent Abstracts of Japan, Kokai No. 57-50330, vol. 6, No. 125, Jul. 1982.

*Primary Examiner*—W. R. Young
*Attorney, Agent, or Firm*—Fitzpatrick, Cella, Harper & Scinto

[57] ABSTRACT

Different tracks on an optical information recording medium are irradiated with first and second light spots for auto-tracking. The light of the first light spot via the recording medium is detected to produce a first detection signal and light of the second light spot via the recording medium is also detected to produce a second detection signal. On the basis of a difference between the first and second detection signals, a signal used for performing tracking control of a third light spot for recording or reproducing information is generated. When recording or reproduction of information is effected on/from one of a first recording medium having a track pitch $P_1$ and a second recording medium having a track pitch $P_2$ and the first and second recording media satisfy a relation $P_1-P_2=d$ (d is the width of the tracking track) while executing auto-tracking control, a relationship of a direction of movement of the third light spot in a track intersecting direction with respect to a polarity of a signal obtained by subtracting the second detection signal from the first detection signal between the first and second recording media is inverted.

29 Claims, 12 Drawing Sheets

($T_A - T_B$)

($T_B - T_A$)

(T_A − T_B)

(T_B − T_A)

1

OPTICAL INFORMATION RECORDING/ REPRODUCING METHOD AND APPARATUS FOR PERFORMING AUTO-TRACKING CONTROL USING A THREE-BEAM METHOD, WITH RESPECT TO FIRST AND SECOND RECORDING MEDIA HAVING DIFFERENT TRACK PITCHES

This application is a continuation of application Ser. No. 08/314,378, filed Sep. 28, 1994, now abandoned.

BACKGROUND OF THE INVENTION

1. Field of the Invention

The present invention relates to an optical information recording/reproduction method and apparatus for recording/reproducing information by irradiating a light beam onto an optical information recording medium and, more particularly, to an optical information recording/reproduction method and apparatus for performing auto-tracking control using a 3-beam method.

2. Related Background Art

As information recording media for recording/reproducing information using light, various types of media such as disk-shaped media, card-shaped media, tape-shaped media, and the like are known. Some of these optical information recording media allow both recording and reproduction and some others allow only reproduction. Information is recorded on a recordable medium by scanning an information track with a light beam which is modulated according to recording information and is focused to a small spot shape. In this case, information is recorded as an optically detectable information bit string.

Information is reproduced from a recording medium by scanning the information bit string on the information track with a light beam spot of a constant power which does not allow recording on the medium, and by detecting light reflected by or transmitted through the medium.

An optical head used for recording/reproducing information on/from a recording medium is movable relative to the recording medium in the information track direction of the medium and a direction intersecting the information track direction. Upon movement of the optical head, a light beam spot is scanned on an information track. As a lens for focusing a light beam spot in the optical head, for example, an objective lens is used. The objective lens is held by an optical head main body to be independently movable in its optical axis direction (focusing direction) and a direction (tracking direction) perpendicular to both the optical axis direction and the information track direction of the recording medium. The objective lens is normally held via an elastic member, and the movement of the objective lens in the two directions is normally attained by an actuator which utilizes a magnetic interaction.

Of the above-mentioned optical information recording media, a card-shaped optical information recording medium (to be referred to as an optical card hereinafter) is compact and light in weight, and a large demand is expected in the future as portable, relatively large-capacity information recording media.

FIG. 1 is a plan view of a write-once type optical card, and FIG. 2 is a partial enlarged view thereof.

Referring to FIG. 1, a large number of parallel information tracks 2 are arranged in an L-F direction on the information recording surface of an optical card 1. Also, a home position 3 serving as a reference position for access to the information tracks 2 is defined on the information recording surface of the optical card 1. The information tracks 2 (2-1, 2—2, 2-3, . . . ) are arranged in turn from a position near the home position 3, and tracking tracks 4 (4-1, 4-2, 4-3, . . . ) are arranged in turn at positions neighboring the corresponding information tracks, as shown in FIG. 2. These tracking tracks 4 are used as guides for auto-tracking (to be abbreviated as AT hereinafter) for controlling a light beam spot from falling outside a predetermined information track upon scanning of the beam spot in an information recording/reproduction mode.

The AT servo is realized as follows. That is, an optical head detects a deviation (AT error) of the light beam spot from the information track, and negatively feeds back the detection signal to a tracking actuator. The tracking actuator moves an objective lens in the tracking direction (D direction) with respect to the optical head main body, thus tracking the light beam spot on a desired information track.

In the information recording/reproduction mode, upon scanning of the information track with the light beam spot, auto-focusing (to be abbreviated as AF hereinafter) servo is executed to form (focus) the light beam into a spot shape having a proper size on the optical card surface. The AF servo is attained as follows. That is, the optical head detects a deviation (AF error) of the light beam spot from the in-focus state, and negatively feeds back the detection signal to a focusing actuator. The focusing actuator moves the objective lens in the focusing direction with respect to the optical head main body, thus focusing the light beam spot on the optical card surface.

Note that $S_1$, $S_2$, and $S_3$ in FIG. 2 represent light beam spots. AT control is performed using the light spots $S_1$ and $S_3$, and AF control, formation of information bits in a recording mode, and reading of the information bits in a reproduction mode are performed using the light spot $S_2$. Each information track has pre-formatted left address portions 6-1 and 6-2 and right address portions 7-1 and 7-2. By reading out the address portion, the information track is identified. On a data portion 5 (corresponding to 5-1 and 5-2 in FIG. 2), predetermined information is recorded.

An optical information recording method will be explained below with reference to the schematic view of an optical head optical system shown in FIG. 3.

Referring to FIG. 3, a semiconductor laser 21 serves as a light source, and emits light having a wavelength of 830 nm, which is polarized in a direction parallel to the plane of the drawing. The optical system also includes a collimator lens 22, a beam shaping prism 23, a diffraction grating 24 for splitting a light beam, and a polarization beam splitter 25. Furthermore, the optical system includes a quarterwave plate 26, an objective lens 27, a cylindrical lens 29, and a photodetector 30.

A light beam emitted from the semiconductor laser 21 is incident on the collimator lens as a divergent light beam. The divergent light beam is converted into a collimated light beam by the collimator lens, and the collimated light beam is shaped by the beam shaping prism 23 into a beam having a predetermined light intensity distribution, i.e., a circular intensity distribution. The light beam is incident on the diffraction grating 24, and is split into three effective light beams (a 0th-order diffracted light beam and ±1st-order diffracted light beams). These three light beams are incident on the polarization beam splitter 25 as p-polarized light beams. The polarization beam splitter 25 has spectrum characteristics shown in FIG. 4, and the incident p-polarized light beams are transmitted through the beam splitter 25 by almost 100%.

The three light beams are transmitted through the quarterwave plate 26. In this case, these light beams are converted into circularly polarized light beams, and the circularly polarized light beams are focused on the optical card 1 by the objective lens 27. The focused light beams correspond to three small beam spots $S_1$ (+1st-order diffracted light), $S_2$ (0th-order diffracted light), and $S_3$ (−1st-order diffracted light), as shown in FIG. 2. The spot $S_2$ is used for recording, reproduction, and AF control, and the spots $S_1$ and $S_3$ are used for AT control. The spot positions on the optical card 1 are as shown in FIG. 2. That is, the light beam spots $S_1$ and $S_3$ are located on the neighboring tracking tracks 4, and the light beam spot $S_2$ is located on the information track 2 between these tracking tracks. Reflected light beams from the light beam spots formed on the optical card 1 are converted into collimated beams via the objective lens 27 again, and are then converted via the quarterwave plate 26 into light beams whose direction of polarization is rotated through 90° from that in the incident state. These light beams are incident on the polarization beam splitter 25 as s-polarized light beams, and are reflected by almost 100% due to the spectrum characteristics shown in FIG. 4. The reflected light beams are then guided to a detection optical system.

In the detection optical system, a spherical lens 28 and the cylindrical lens 29 are combined. With this combination of the lenses, AF control based on an astigmatism method is performed. The three beams reflected by the optical card 1 are respectively focused by the detection optical system, and are incident on the photodetector 30 to form three light spots. The photodetector 30 comprises light-receiving elements 30a and 30c, and a four-split light-receiving element 30b, as shown in FIG. 5. The light-receiving elements 30a and 30c receive the reflected light beams of the light spots $S_1$ and $S_3$, and the AT control is performed using the difference between the outputs from these two light-receiving elements. Also, the four-split light-receiving element 30b receives the reflected light beam of the light spot $S_2$, and the AF control and reproduction of recorded information are performed using the output from this light-receiving element.

Processing of the signals detected by the detection optical system will be described below with reference to FIG. 6. The reflected light beams from the light spots $S_1$, $S_2$, and $S_3$ formed on the optical card 1 respectively form light spots $S_a$, $S_b$, and $S_c$ on the light-receiving elements 30a, 30b, and 30c of the photodetector 30.

Outputs from split portions in the respective diagonal directions of the four-split light-receiving element 30b are respectively added by adders 117 and 118. The outputs from these adders 117 and 118 are added by an adder 121, thus obtaining an information reproduction signal RF. More specifically, the information reproduction signal RF corresponds to the total light amount of the light spot $S_b$ formed on the four-split light-receiving element 30b. The output from the adder 118 is subtracted from the output from the-adder 117 by a differential circuit 120, thus obtaining an AF control signal Af.

The output from the light-receiving element 30c is subtracted from the output from the light-receiving element 30a by a differential circuit 119, thus obtaining an AT control signal At. Normally, the AT control is performed to make the AT control signal At zero. When the two light spots $S_1$ and $S_3$ on the optical card 1 shown in FIG. 2 overlap the corresponding tracking tracks (grooves) 4-2 and 4-3 by equal areas, the light amounts of the light spots $S_a$ and $S_c$ on the light-receiving elements 30a and 30c become equal to each other. Therefore, when the control is performed to make the AT control signal At zero, the light spot $S_2$ on the optical card 1 is located just at the central position between the tracking tracks 4-2 and 4-3.

When recording is performed on an optical card at still higher density, the track pitch must be further decreased. In order to obtain a proper AT control signal upon recording/reproduction of information on/from a plurality of types of recording media having different track pitches, an optical system of a recording/reproduction apparatus must be re-designed or re-adjusted in a conventional system. However, it is not efficient to use a plurality of apparatuses having different optical systems, and it is troublesome and inefficient to adjust an optical system each time a different medium is used.

SUMMARY OF THE INVENTION

It is, therefore, an object of the present invention to provide an optical information record/reproduction method which can efficiently recording/reproduce information while satisfactorily executing AT control for optical information recording media having different track pitches.

It is another object of the present invention to provide an optical information recording/reproduction apparatus having compatibility with optical information recording media having different track pitches.

In order to achieve the above objects, according to the present invention, there is provided an optical information recording/reproduction apparatus for recording and/or reproducing information by irradiating a light spot onto an optical information recording medium, comprising:

means for irradiating different tracking tracks with first and second light spots for auto-tracking;

first detection means for obtaining a first detection signal by detecting light of the first light spot via the tracking track;

second detection means for obtaining a second detection signal by detecting light of the second light spot via the tracking track;

generating means for generating a signal used for performing tracking control of a third light spot, which is used for recording or reproducing information, on the basis of a difference between the first and second detection signals; and inverting means for inverting, upon recording or reproduction of information on or from one of first and second recording media having different track pitches $P_1$ and $P_2$ which satisfy a relation $P_1-P_2=2$ d (d is the width of the tracking track) while executing auto-tracking control, a relationship of a direction of movement of the third light spot in a track intersecting direction with respect to a polarity of a signal obtained by subtracting the second detection signal from the first detection signal between the first and second recording media.

According to one aspect of the present invention, the apparatus comprises subtraction means for subtracting the second detection signal from the first detection signal, and auto-tracking characteristic switching means for, when a recording medium to be subjected to recording/reproduction is one of a recording medium having the track pitch $P_1$ and a recording medium having the track pitch $P_2$, directly outputting the output from the subtraction means, and for, when the recording medium to be subjected to recording/reproduction is the other recording medium, inverting the polarity of the output from the subtraction means and outputting the inverted output.

According to another aspect of the present invention, the apparatus comprises input means for inputting information indicating whether a recording medium inserted for recording/reproduction is a recording medium having the track pitch $P_1$ or a recording medium having the track pitch $P_2$, and the input means sets the relationship of a driving direction of movement of the third light spot in a track intersecting direction upon auto-tracking control with respect to the polarity of a signal obtained by subtracting the second detection signal from the first detection signal.

According to still another aspect of the present invention, the apparatus comprises discrimination means for discriminating whether a recording medium inserted for recording/reproduction is a recording medium having the track pitch $P_1$ or a recording medium having the track pitch $P_2$, and the relationship of a driving direction of movement of the third light spot in a track intersecting direction upon auto-tracking control with respect to the polarity of a signal obtained by subtracting the second detection signal from the first detection signal is set on the basis of the discrimination result from the discrimination means. The discrimination means may discriminate the recording medium by detecting the track pitch of the recording medium The track pitch may be detected by moving a light spot to intersect a track, and detecting reflected light from the light spot. The track pitch may be detected upon insertion of the recording medium. The recording medium may be inserted in the track intersecting direction.

According to the present invention, it is preferable that the first and second light spots for a recording medium having the track pitch $P_1$ be located near the edges of corresponding tracking tracks in a normal state free from a tracking error, and the first and second light spots for a recording medium having the track pitch $P_2$ be located near the edges of corresponding tracking tracks in a normal state free from a tracking error. Also, it is preferable that the diameter D of each of the first and second light spots satisfy a relation $D<(P_2+d)/2$.

According to the present invention, there is also provided an optical information recording/reproduction method for recording and/or reproducing information by irradiating a light spot onto an optical information recording medium, comprising:

a step of irradiating different tracking tracks with first and second light spots for auto tracking onto different tracking tracks;

a first detection step of obtaining a first detection signal by detecting light of the first light spot via the tracking track;

a second detection step of obtaining a second detection signal by detecting light of the second light spot via the tracking track;

the generating step of generating a signal used for performing tracking control of a third light spot, which is used for recording or reproducing information, on the basis of a difference between the first and second detection signals; and an inverting step of inverting, upon recording information on or reproducing information from one of first and second recording media having different track pitches $P_1$ and $P_2$ which satisfy a relation $P_1-P_2=2$ d (d is the width of the tracking track) while executing auto-tracking control, a relationship of a direction of movement of the third light spot in a track intersecting direction with respect to a polarity of a signal obtained by subtracting the second detection signal from the first detection signal between the first and second recording media.

Other arrangements of the present invention will become apparent from the following detailed description.

DETAILED DESCRIPTION OF THE PREFERRED EMBODIMENTS

The preferred embodiments of the present invention will be described in detail hereinafter with reference to the accompanying drawings.

Figure 7A:
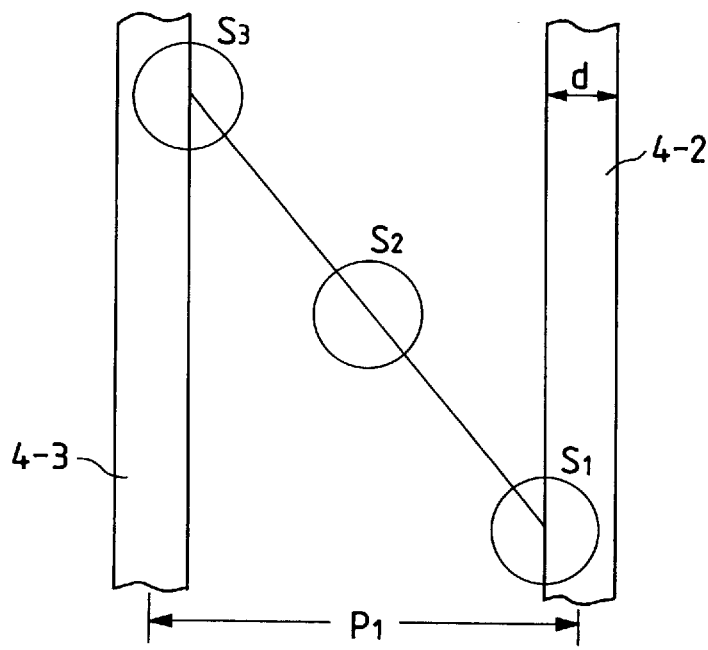
FIGS. 7A and 7B are views showing the relationships between the recording surfaces of two different optical cards, used in an optical information recording/reproduction apparatus according to the present invention, and three beam spots.
Figure 7B:
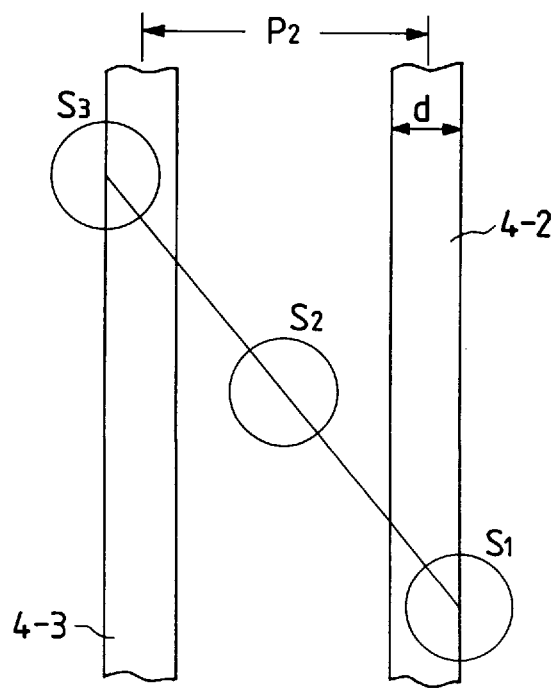

FIGS. 7A and 7B show the relationships between the recording surfaces of two different optical cards used in an optical information recording/reproduction apparatus of the present invention, and three beam spots. FIG. 7A shows an optical card A (a track pitch $P_1=12$ μm) which has been conventionally used, and FIG. 7B shows an optical card B (a track pitch $P_2=8$ μm) which is newly manufactured and allows recording at higher density. A width d of each of tracking tracks (grooves) 4-2 and 4-3 is 2 μm in either optical card. The tracking track width d may assume other values (e.g., 3 μm).

As shown in FIGS. 7A and 7B, three beam spots $S_1$, $S_2$, and $S_3$ are formed at equal intervals on both the optical cards A and B by an optical system of a recording/reproduction apparatus. The two light spots $S_1$ and $S_3$ for AT control are located on the inner edges of the two neighboring tracking tracks in FIG. 7A, and are located on the outer edges of the two neighboring tracking tracks in FIG. 7B.

Figure 1:
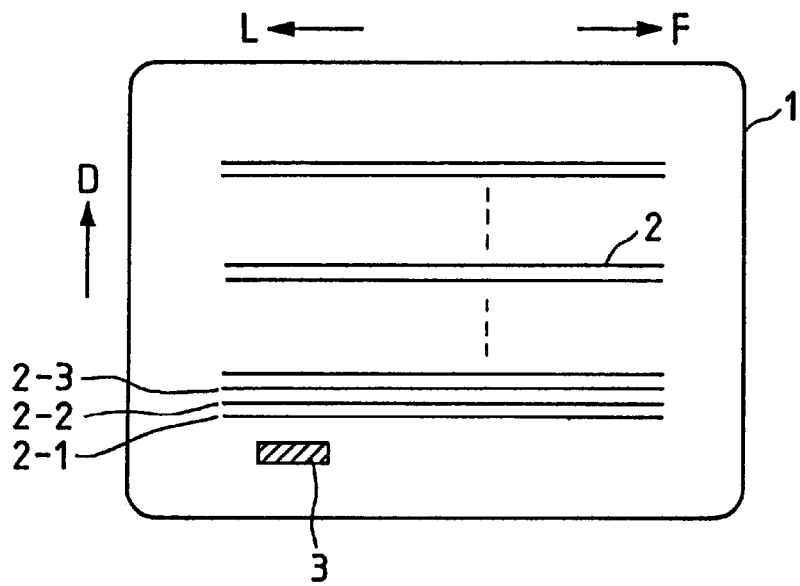
FIG. 1 is a plan view of an optical card.
Figure 2:
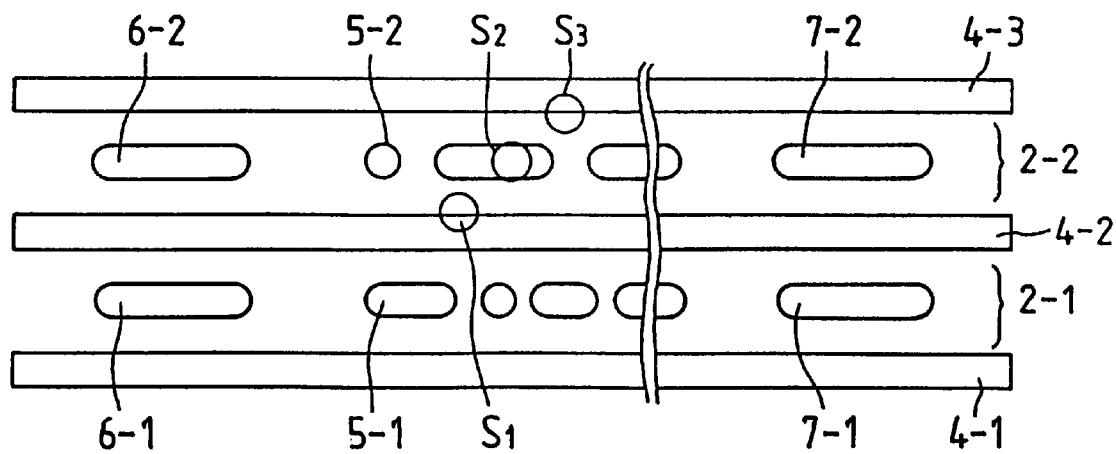
FIG. 2 is a partial, enlarged view of the optical card.
Figure 3:
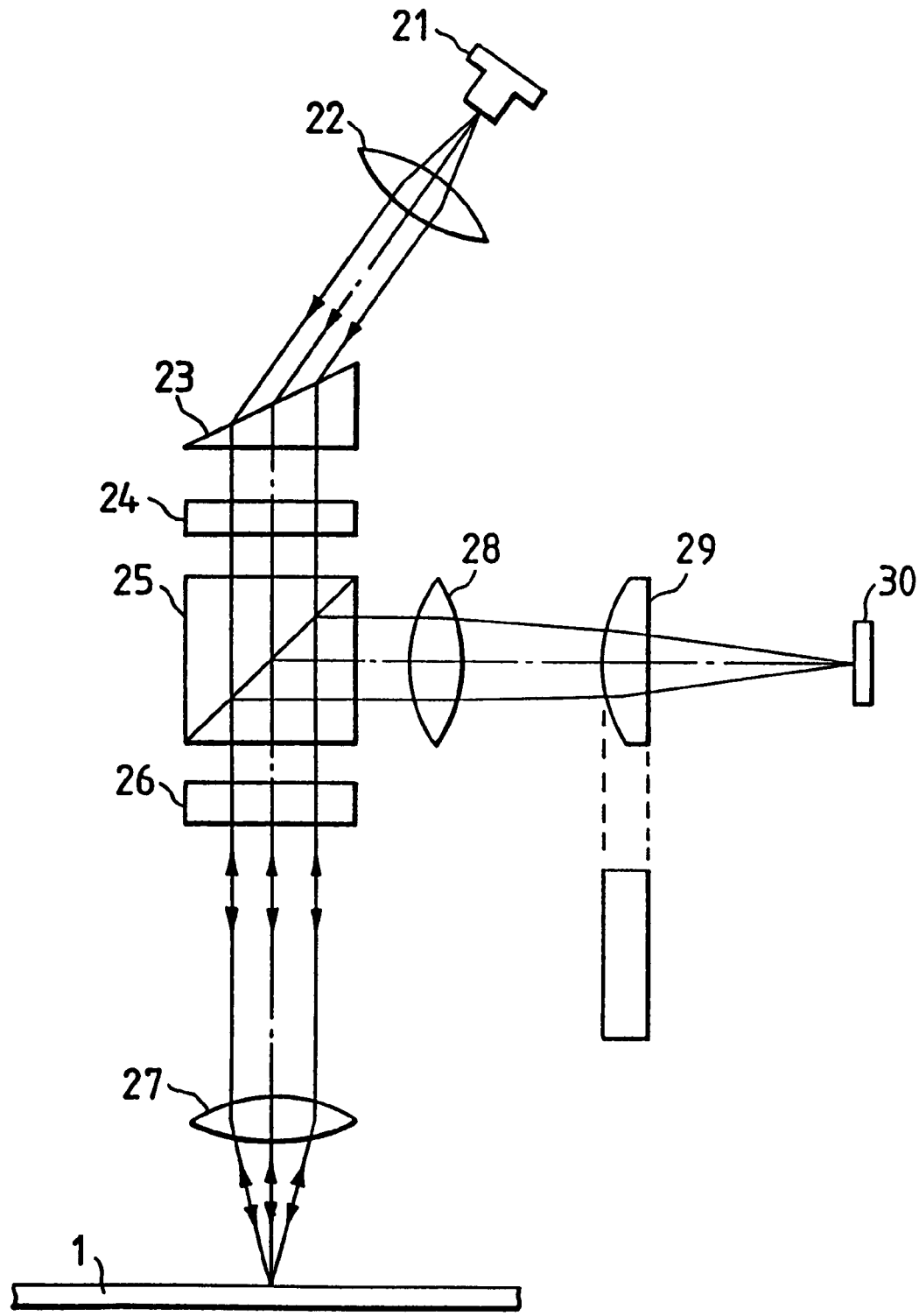
FIG. 3 is a schematic view of an optical head optical system.
Figure 4:
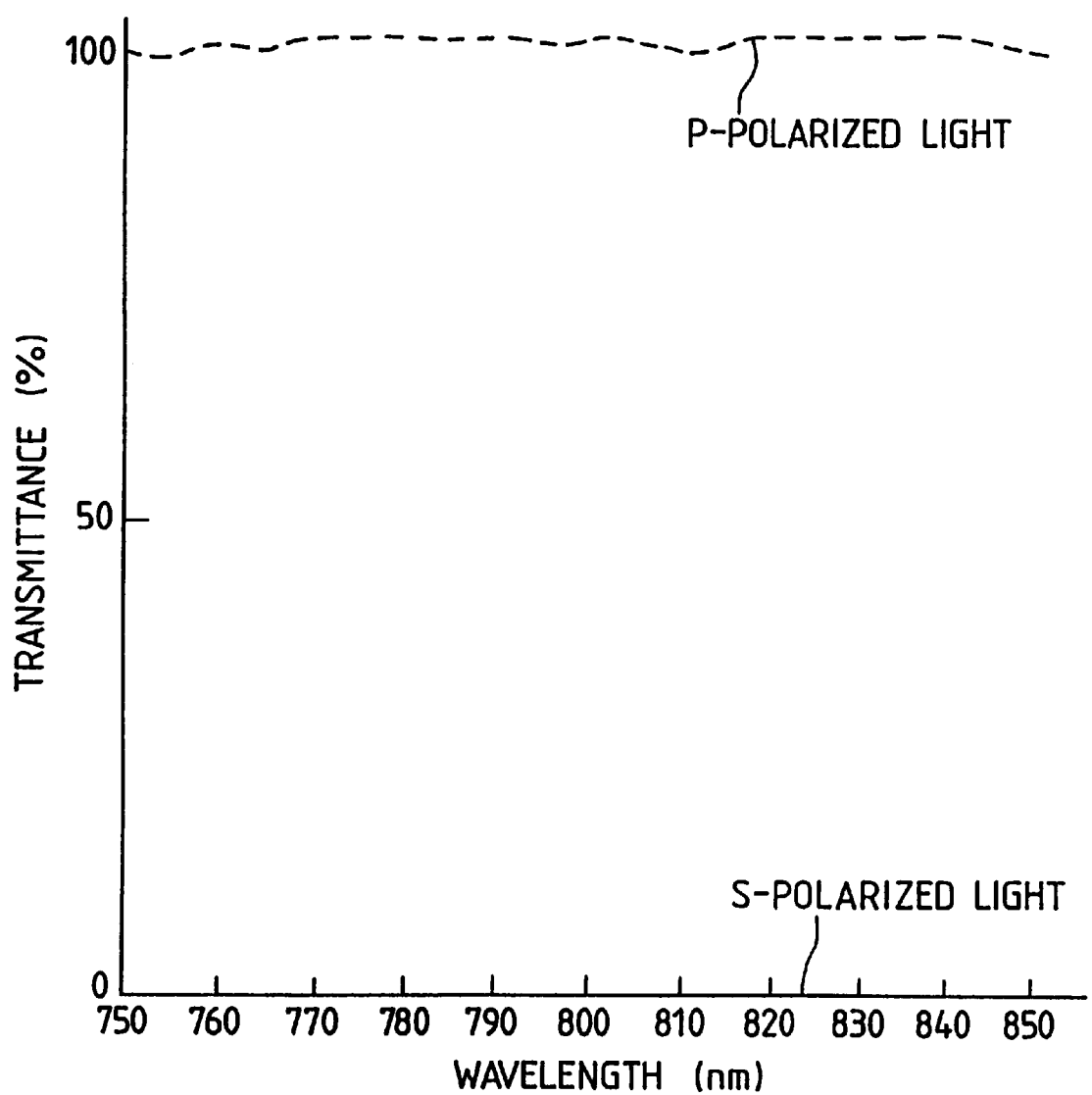
FIG. 4 is a graph showing the spectrum characteristics of a polarization beam splitter.
Figure 5:
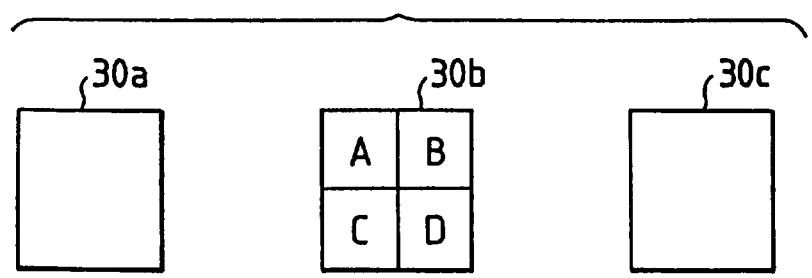
FIG. 5 is a plan view showing light-receiving elements of a photodetector in an optical head.
Figure 6:
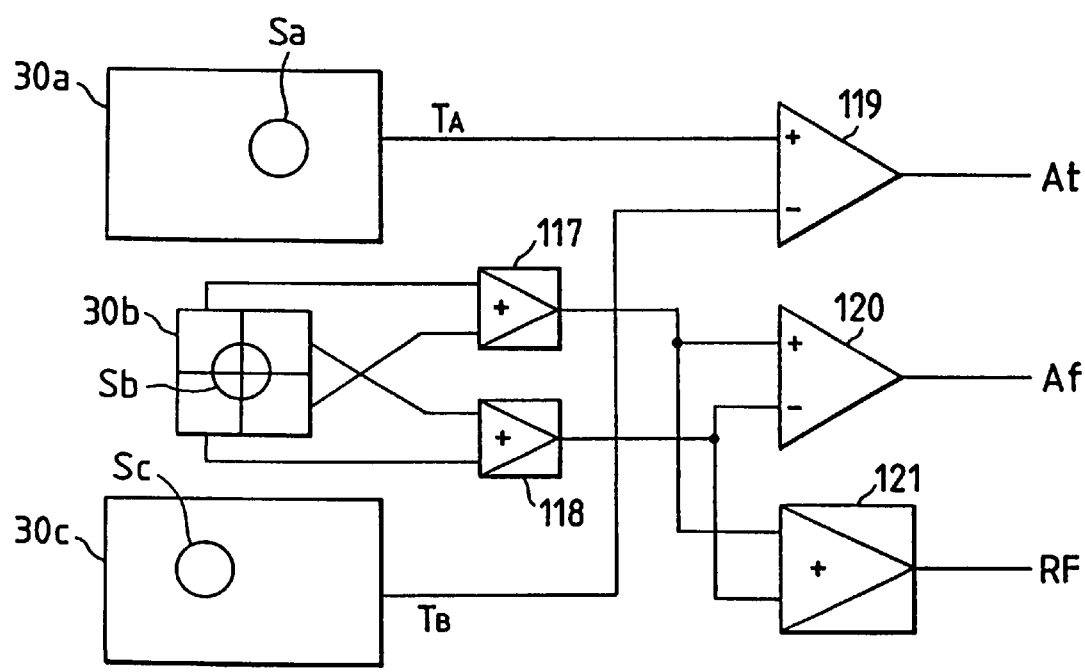
FIG. 6 is a block diagram showing a processing system of signals detected by a detection optical system in the optical head in an optical information recording/reproduction apparatus.
Figure 8:
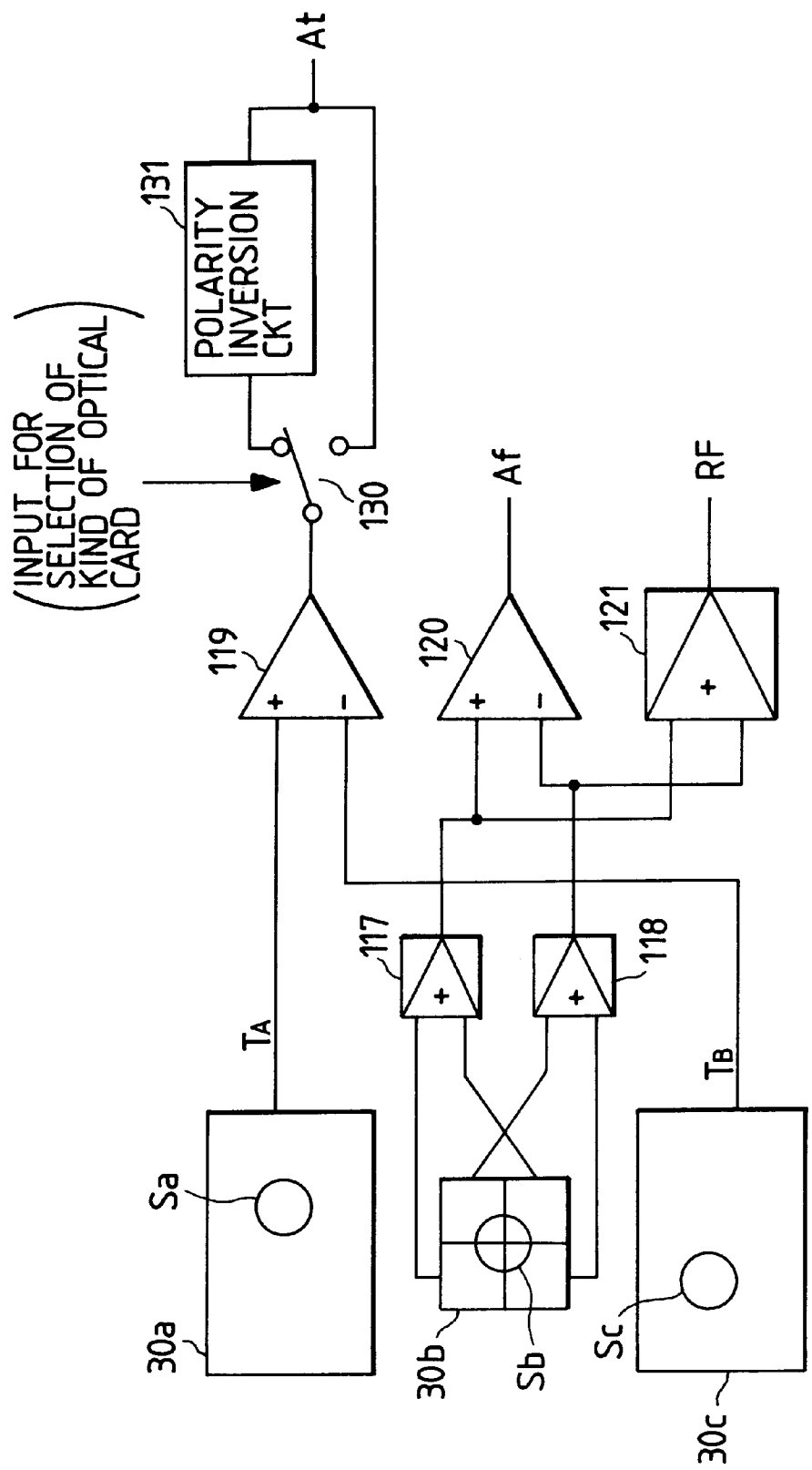
FIG. 8 is a block diagram showing a processing system of signals detected by a detection optical system in an optical head in an optical information recording/reproduction apparatus according to the present invention.

FIG. 8 is a block diagram showing an example of a processing system for signals detected by a detection optical system of an optical head in an optical information recording/reproduction apparatus of the present invention. The same reference numerals in FIG. 8 denote parts having the same functions as in FIG. 6. Referring to FIG. 8, a selection switch 130 is controlled by an input for selection of the kind of optical card. The switch 130 is connected to a polarity inversion circuit 131. The output from a differential circuit 119 is output as an AT control signal At directly or via the polarity inversion circuit 131.

Figure 9A:
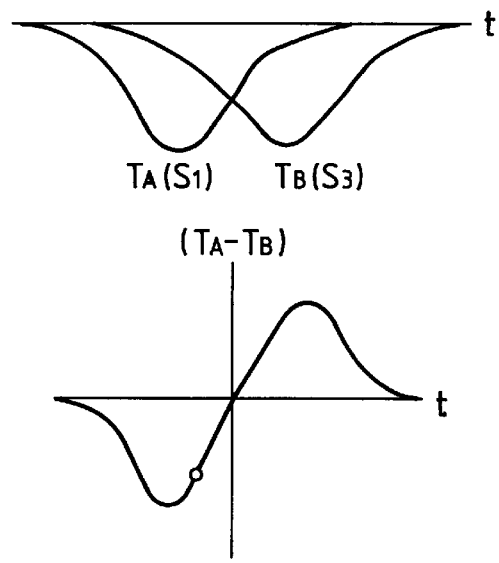
FIGS. 9A and 9B are graphs respectively showing the outputs from light-receiving elements and the output from a differential circuit, which outputs are obtained when light spots are moved in a specific direction in the track intersecting direction.
Figure 9B:
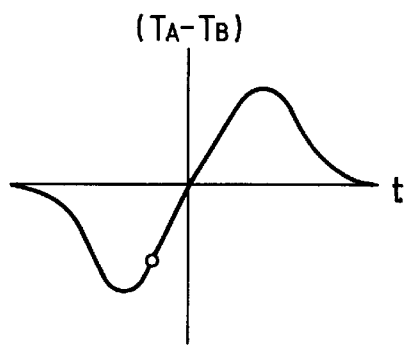

FIGS. 9A and 9B show the output from a light-receiving element 30a, i.e., a track intersecting signal $T_A$, the output from a light-receiving element 30b, i.e., a track intersecting signal $T_B$, and the output from the differential circuit 119, i.e., an S-shaped signal $(T_A-T_B)$, which outputs are obtained when the light spots $S_1$, $S_2$, and $S_3$ are moved in a specific direction in the track intersecting direction on the above-mentioned optical card A.

Figure 10A:
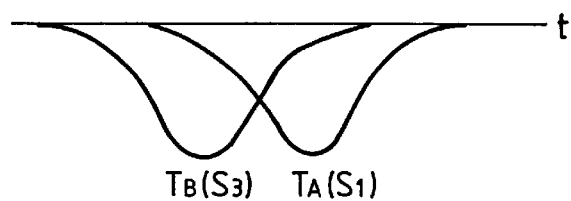
FIGS. 10A, 10B, and 10C are graphs respectively showing the outputs from the light-receiving elements, the output from the differential circuit, and an AT control signal output from a polarity inversion circuit via a selection switch, which outputs are obtained when the light spots are moved in a specific direction in the track intersecting direction.
Figure 10B:
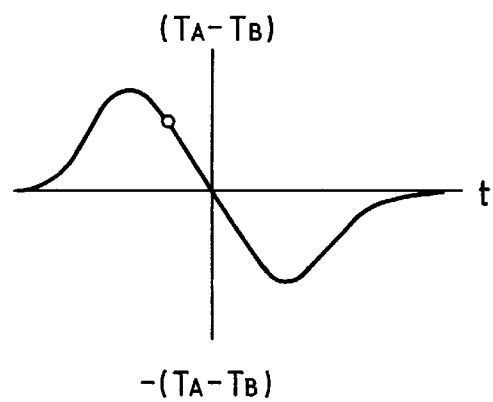
Figure 10C:
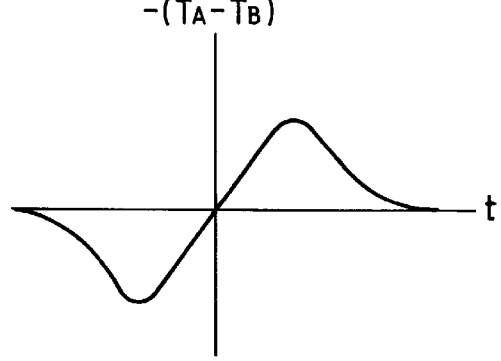

FIGS. 10A, 10B, and 10C show the output from the light-receiving element 30a, i.e., a track intersecting signal $T_A$, the output from the light-receiving element 30b, i.e., a track intersecting signal $T_B$, the output from the differential circuit 119, i.e., an S-shaped signal $(T_A-T_B)$, and an AT control signal $-(T_A-T_B)=(T_B-T_A)$ output from the polarity inversion circuit 131 via the selection switch 130, which outputs are obtained when the light spots $S_1$, $S_2$, and $S_3$ are moved in a specific direction in the track intersecting direction on the above-mentioned optical card B.

As described above, the order of the track intersecting signal $T_A$ generated based on the light spot $S_1$ and the track intersecting signal $T_B$ generated based on the light spot $S_2$ of the optical card A is opposite to that of the optical card B, and the polarity of the S-shaped signal $(T_A-T_B)$ is inverted accordingly.

Figure 11:
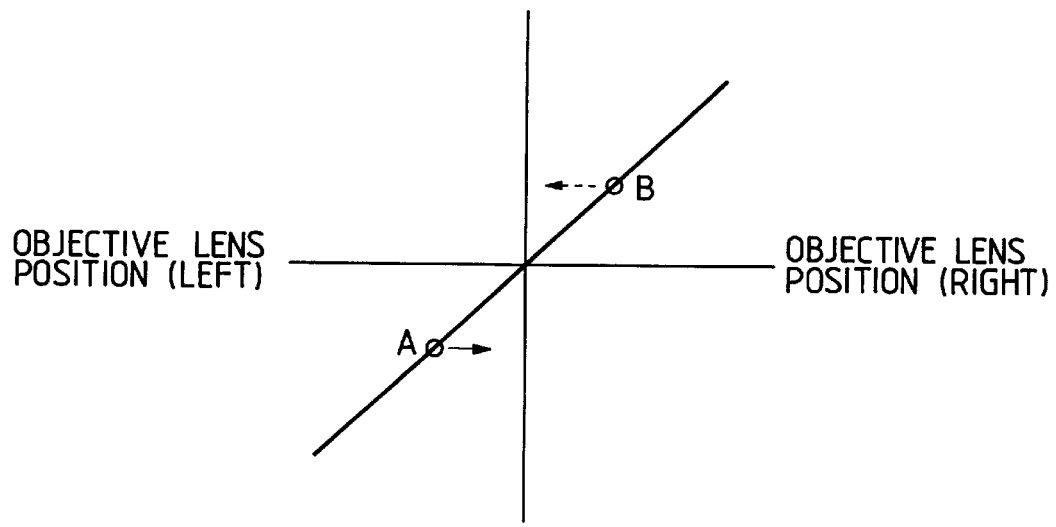
FIG. 11 is an explanatory view showing the relationship between an AT control signal and movement of an objective lens.

FIG. 11 is an explanatory view of the movement of an objective lens obtained when the signal $(T_A-T_B)$ is directly input to an objective lens driving circuit as the AT control signal At. If the positions of the light spots are offset to the left from their regular positions, the signal $(T_A-T_B)$ exhibits a negative value, as shown in FIG. 9B, on the optical card A. Therefore, the objective lens moves to the right to make the signal $(T_A-T_B)$ zero, as indicated by an arrow A in FIG. 11, and the light spots then converge to regular positions (i.e., a state wherein the light spot $S_2$ for recording/reproduction is located just at the center between the tracking tracks 4-2 and 4-3). In contrast to this, on the optical card B, if the light spot positions are offset to the left from their regular positions, the signal $(T_A-T_B)$ exhibits a positive value. Therefore, the objective lens moves to the left to make the signal $(T_A-T_B)$ zero, as indicated by an arrow B in FIG. 11, and the light spots cannot converge to the regular spot positions.

In order to avoid this, according to the present invention, the selection switch 130 is appropriately switched in response to the input for selection of the kind of optical card, which indicates the optical card A or B to be used, thereby inverting the polarity of the AT control signal At to be used. With this control, when the optical card A is to be used, the S-shaped signal $(T_A-T_B)$ is directly input to the objective lens driving circuit as the AT control signal At as in the conventional apparatus. On the other hand, when the optical card B is to be used, a signal $(T_B-T_A)$ obtained by inverting the polarity of the S-shaped signal $(T_A-T_B)$ is input to the objective lens driving circuit as the AT control signal At. Note that this switching control can be attained in a software manner.

Note that the input for selection of the kind of optical card may be manually generated by an operator. Alternatively, optical card discrimination means may be arranged to discriminate the kind of card which is inserted in the apparatus, and the switch 130 may be automatically controlled on the basis of the discrimination result.

In the above-mentioned embodiment, the polarity of the AT control signal At is controlled in correspondence with a recording medium, and thereafter, the AT control signal is input to the objective lens driving circuit. However, the present invention is not limited to this. For example, the AT control signal may be directly input to the objective lens driving circuit without controlling its polarity as in the conventional apparatus, and the objective lens driving circuit may invert the polarity of the driving circuit in correspondence with a recording medium.

As described above, by inverting the polarity of the AT control signal, a single apparatus can easily and efficiently perform optical information recording/reproduction while satisfactorily executing AT control for both of two different recording media having different track pitches, which have a specific relationship therebetween, without re-designing or re-adjusting the optical head optical system.

The above-mentioned optical card discrimination means for the input for selection of the kind of optical card will be exemplified below.

Figure 12A:
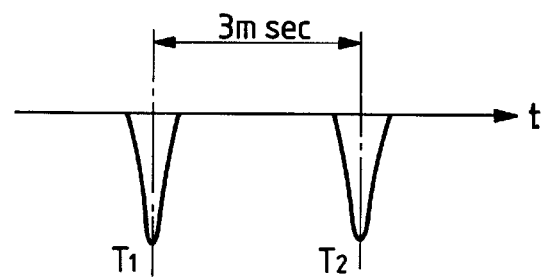
FIGS. 12A and 12B are graphs showing the detection signals of two neighboring tracking tracks obtained when a single light spot is moved at a constant speed in the track intersecting direction.
Figure 12B:
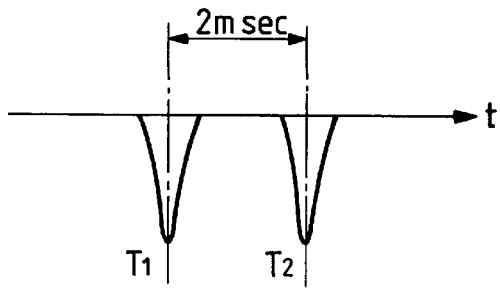

FIGS. 12A and 12B show detection signals $T_1$ and $T_2$ of two neighboring tracking tracks, obtained when a single light spot is moved at a constant speed in the track intersecting direction. As the light spot, the spot $S_2$ can be used, and in this case, the output from an adder 121 shown in FIG. 8 can be detected. In the case of the optical card A, since the track pitch $P_1$ is 12 μm, when the light spot is moved at a constant speed V=4 mm/sec, detection signals are obtained at a 3-msec interval, as shown in FIG. 12A. On the other hand, in the case of the optical card B, since the track pitch $P_2$ is 8 μm, when the light spot is moved at a constant speed V=4 mm/sec, detection signals are obtained at a 2-msec interval, as shown in FIG. 12B.

The selection switch 130 is controlled in accordance with the discrimination result (i.e., whether the time interval between the two detection signals $T_1$ and $T_2$ is 3 or 2 msec) obtained by the discrimination means, as described above.

Note that the light spot to be used is not limited to the spot $S_2$ but may be the spot $S_1$ or $S_3$. In this case, the output $T_A$ or $T_B$ from the light-receiving element 30a or 30c shown in FIG. 8 can be detected.

As described above, in the recording/reproduction apparatus, whether an inserted optical card is the optical card A or B is automatically discriminated by detecting the time interval between $T_1$ and $T_2$. Thus, a user need not input the kind of card every time a different card is used, and an operation error based on an input error can be prevented.

In the above-mentioned embodiment, since the optical head optical system is used for forming a track intersecting light spot for card discrimination and for detecting the spots, another means need not be added, and the apparatus arrangement can be prevented from being complicated. However, in the present invention, another special-purpose means for discriminating the kind of optical card can be used, as a matter of course, and furthermore, the kind of optical card can be discriminated by detecting a proper identification mark in place of detection of the track pitch.

Also, in the present invention, when the insertion direction of the optical card in the apparatus is set to be perpendicular to the track direction, the kind (A or B) of optical card can be discriminated simultaneously with insertion of the optical card.

Figure 13A:
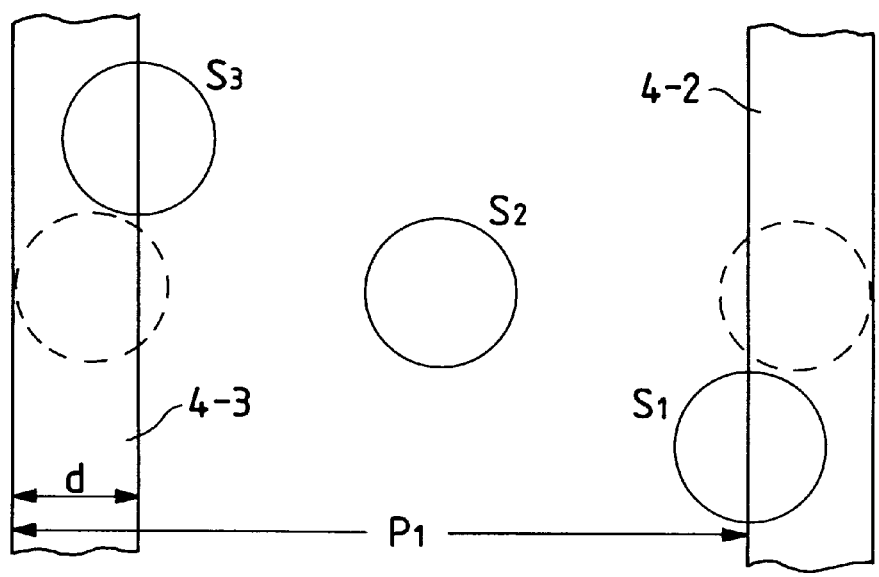
FIGS. 13A and 13B are explanatory views of the light spot arrangement on an optical card in the apparatus of the present invention.
Figure 13B:
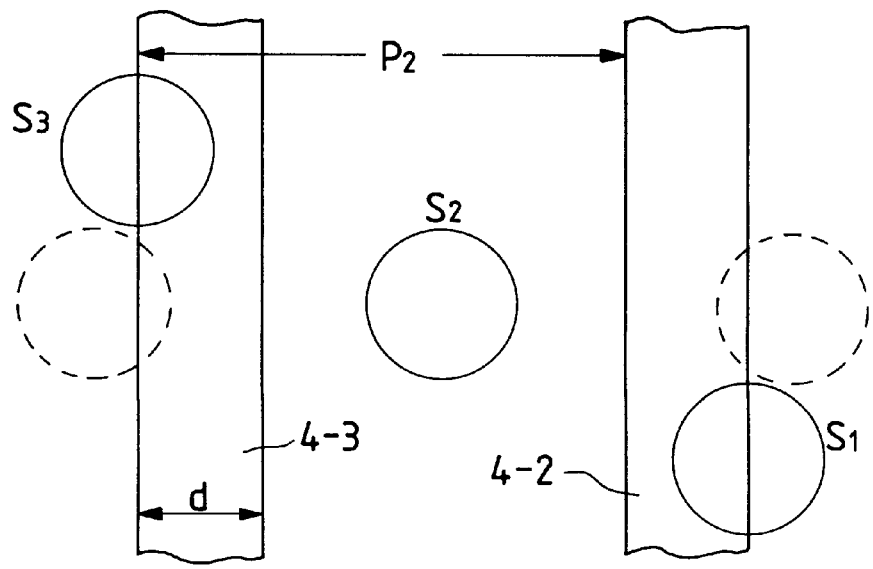
Figure 14A:
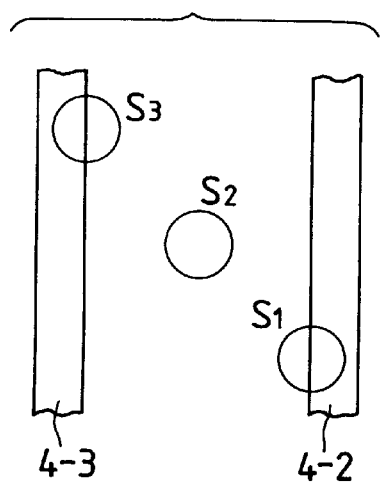
FIGS. 14A to 14F are plan views and graphs respectively showing the light spot arrangement on an optical card, a track intersecting signal and an AT control signal in an optimal arrangement of the present invention.
Figure 14B:
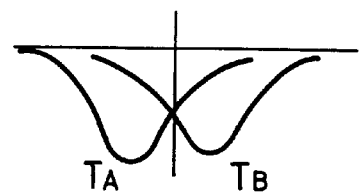
Figure 14C:
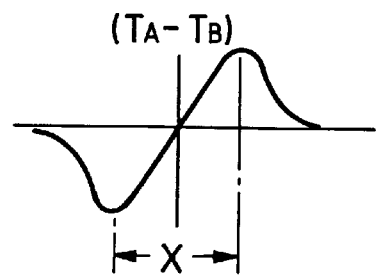
Figure 14D:
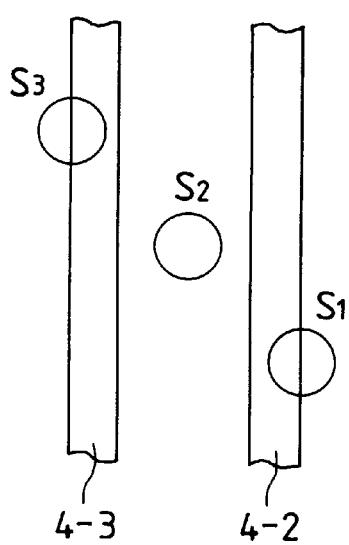
Figure 14E:
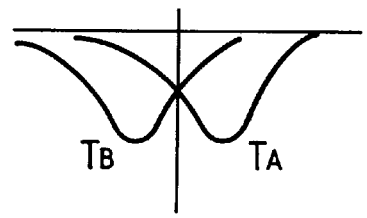
Figure 14F:
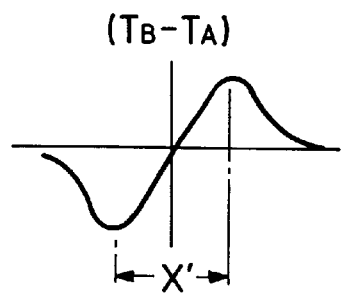
Figure 15A:
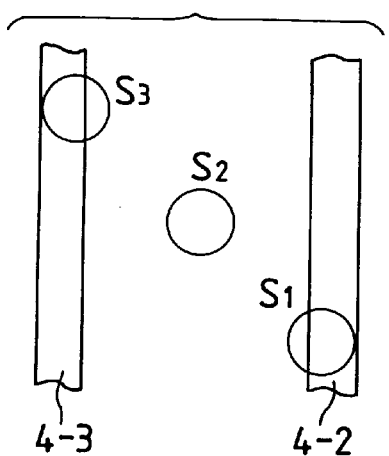
FIGS. 15A to 15F are plan views and graphs respectively showing the light spot arrangement on an optical card, a track intersecting signal and an AT control signal in a general arrangement of the present invention.
Figure 15B:
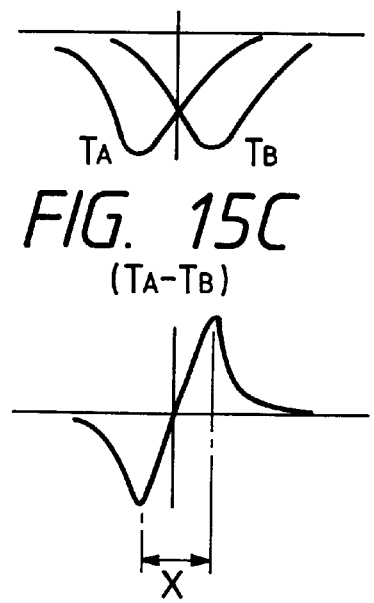
Figure 15C:
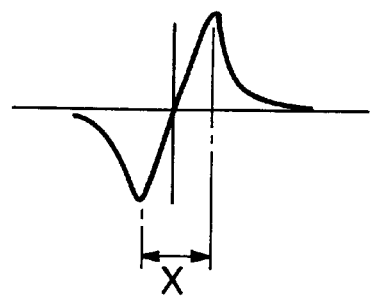
Figure 15D:
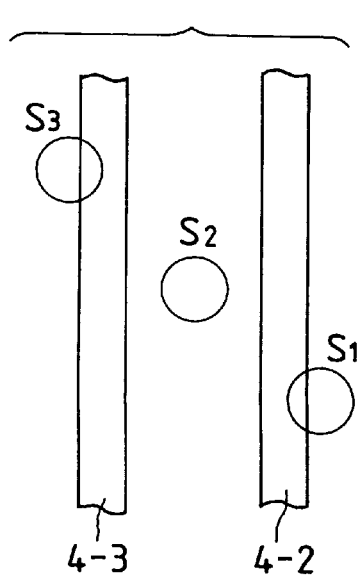
Figure 15E:
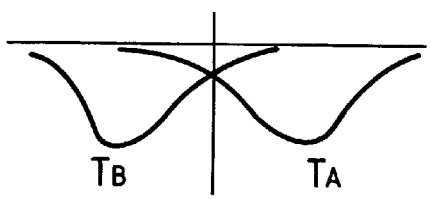
Figure 15F:
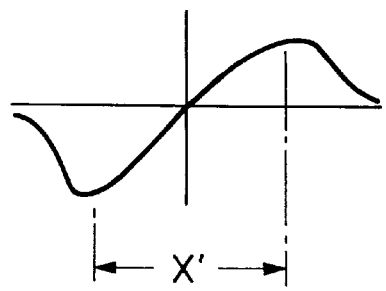
Figure 16A:
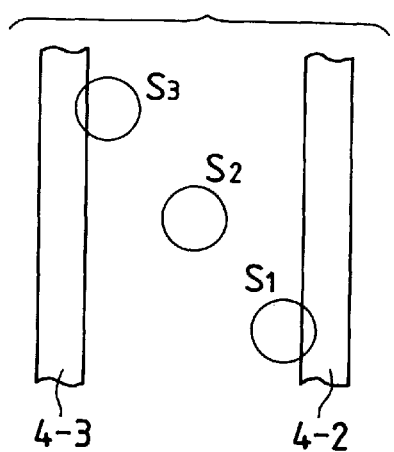
FIGS. 16A to 16F are plan views and graphs respectively showing the light spot arrangement on an optical card, a track intersecting signal and an AT control signal in another general arrangement of the present invention.
Figure 16B:
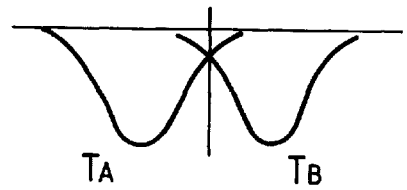
Figure 16C:
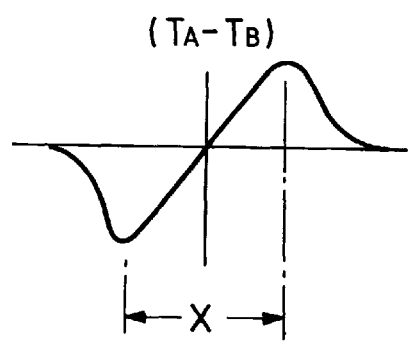
Figure 16D:
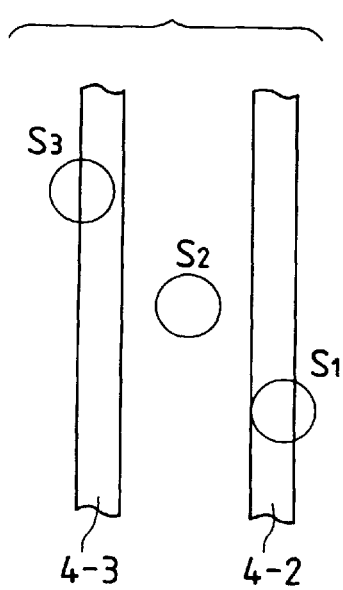
Figure 16E:
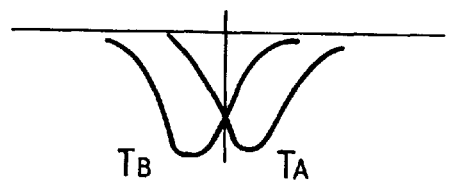
Figure 16F:
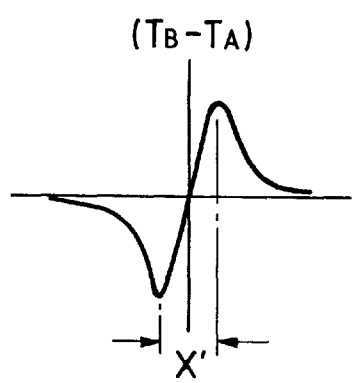

FIGS. 13A and 13B are explanatory views of the light spot arrangement on the optical card in the apparatus of the present invention. FIG. 13A shows the light spot arrangement for the optical card A, and FIG. 13B shows that for the optical card B. In each of FIGS. 13A and 13B, solid circles indicate the arrangement of the light spots $S_1$, $S_2$, and $S_3$ at regular light spot positions in an optimal arrangement in a state free from a tracking error, and broken circles (the circle for the light spot $S_2$ overlaps that in the optimal arrangement) indicate the arrangement of the light spots $S_1$, $S_2$, and $S_3$ in a general arrangement in a state free from a tracking error. In the case of the general arrangement, as indicated by the broken circles, the light spots $S_1$ and $S_3$ overlap the tracking tracks by larger areas on the optical card A, and the light spots $S_1$ and $S_3$ overlap the tracking tracks by small areas on the optical card B. Contrary to this, in the case of the optimal arrangement, the light spots $S_1$ and $S_3$ overlap the tracking tracks just by areas half those of the spots on both the optical cards A and B.

The influence of the above-mentioned positions of the light spots $S_1$ and $S_3$ on the AT control will be explained below. As shown in FIGS. 14A to 14F, in the case of the optimal arrangement, the AT control signal $At=(T_A-T_B)$ for the optical card A becomes the same as the AT control signal $At=(T_B-T_A)$ for the optical card B. Therefore, the appearance intervals of positive, maximal and negative, minimal values of the AT control signal and AT pull-in ranges X and X' are equal to each other. In contrast to this, as shown in FIGS. 15A to 15F, in the case of the general arrangement shown in FIGS. 13A and 13B, the AT control signal $At=(T_A-T_B)$ for the optical card A does not become the same as the AT control signal $At=(T_B-T_A)$ for the optical card B, and the AT pull-in range X for the optical card A is narrow, but the AT pull-in range X' for the optical card B is wide. Note that in the general arrangement shown in FIGS. 16A to 16F (contrary to the general arrangement shown in FIGS. 13A and 13B in which, the light spots $S_1$ and $S_3$ overlap the tracking tracks by small areas on the optical card A, and the light spots $S_1$ and $S_3$ overlap the tracking tracks by large areas on the optical card B), the AT control signal $At=(T_A-T_B)$ for the optical card A does not become the same as the AT control signal $At=(T_B-T_A)$ for the optical card B, and the AT pull-in range X for the optical card A is wide, but the AT pull-in range X' for the optical card B is narrow.

As described above, according to the present invention, by inverting the polarity of the AT control signal, a single apparatus can easily and efficiently perform optical information recording/reproduction while satisfactorily executing AT control for both of two different recording media having different track pitches, which have a specific relationship therebetween, without re-designing or re-adjusting the optical head optical system Also, according to the present invention, since the kind of inserted optical card is automatically discriminated, a user need not input the kind of card every time a different card is used, and an operation error based on an input error can be prevented.

Furthermore, according to the present invention, equivalent AT control can be performed for both of two different kinds of optical information recording media without adding a special circuit and increasing cost.

As described above, according to the present invention, an optical information recording/reproduction method, which can efficiently record/reproduce information while satisfactorily executing AT control for optical information recording media having different track pitches, can be provided, and an optical information recording/reproduction apparatus, which has compatibility with optical information recording media having different track pitches, can be provided.

In the case of the above-mentioned general arrangement, when a different AT control signal At is used depending on the kind of optical card, the objective lens is moved by a different moving amount even for the same variation factor. For this reason, in order to satisfactorily improve the AT control characteristics for both kinds of cards, gain adjustment can be performed in correspondence with, e.g., the kind of optical card. In the case of the above-mentioned optimal arrangement, equivalent AT control characteristics can be realized independently of the optical card A or B without taking any countermeasure and increasing cost, unlike in the general arrangement, and the AT control characteristics can be optimized for both kinds of optical cards.

Note that an AT offset under the influence of neighboring recorded information tracks can be removed by setting a light spot diameter D to satisfy $D <(P_2-d)/2$, and AT control can be performed more satisfactorily.

As described above, equivalent AT control can be performed for both of two different kinds of optical information recording media without adding a special circuit and increasing cost.

What is claimed is:

1. An optical information recording/reproduction apparatus for recording and/or reproducing information by irradiating an optical information recording medium with a light spot, said apparatus comprising:

means for irradiating different tracking tracks with first and second light spots for auto-tracking, respectively;

first detection means for obtaining a first detection signal by detecting light of the first light spot via one of the tracking tracks;

second detection means for obtaining a second detection signal by detecting light of the second light spot via one of the tracking tracks;

generating means for generating a signal used for performing tracking control of a third light spot, interposed between the first and second light spots, which signal is used for recording or reproducing information, on the basis of a difference between the first and second detection signals; and inverting means for inverting, upon recording information on or reproducing information from one of first and second recording media having different track pitches, $P_1$ and $P_2$, which satisfy a relation $P_1-P_2=2$ d, in which d is the width of a tracking track for each of the first and second recording media, while executing auto-tracking control, a relationship of a direction of movement of the third light spot in a track intersecting direction with respect to a polarity of a signal obtained by subtracting the second detection signal from the first detection signal between the first and second recording media.

2. An apparatus according to claim 1, wherein said generating means comprises subtraction means for subtracting the second detection signal from the first detection signal, and said inverting means comprises polarity switching means for directly outputting an output from said subtraction means when recording or reproduction is performed on one of the first and second recording media, and for inverting the polarity of an output from said subtraction means and outputting the inverted output when recording or reproduction is performed on the other one of the first and second recording media.

3. An apparatus according to claim 1, further comprising:

input means for inputting information indicating whether a recording medium inserted in said optical information recording/reproduction apparatus is the first recording medium or the second recording medium, and wherein said apparatus determines the direction of movement of the third light spot in the track intersecting direction with respect to the polarity of the signal obtained by subtracting the second detection signal from the first detection signal in accordance with an instruction from said input means.

4. An apparatus according to claim 1, further comprising:

discrimination means for discriminating whether a recording medium inserted in said optical information recording/reproduction apparatus is the first recording medium or the second recording medium, and wherein said apparatus determines the direction of movement of the third light spot in the track intersecting direction with respect to the polarity of the signal obtained by subtracting the second detection signal from the first detection signal in accordance with a discrimination result from said discrimination means.

5. An apparatus according to claim 4, wherein said discrimination means comprises track pitch detection means for detecting a track pitch of a recording medium, and discriminates the first recording medium or the second recording medium by detecting the track pitch.

6. An apparatus according to claim 5, wherein said track pitch detection means detects the track pitch by detecting light obtained by causing the light spot to intersect across the track.

7. An apparatus according to claim 6, wherein said track pitch detection means detects the track pitch when the recording medium is inserted in said apparatus.

8. An apparatus according to claim 7, wherein an insertion direction of the recording medium in said apparatus is the track intersecting direction of the recording medium.

9. An apparatus according to claim 1, wherein the first and second light spots are located near edges of the corresponding tracking tracks on the first recording medium in a state free from a tracking error, and the first and second light spots are located near edges of corresponding tracking tracks on the second recording medium also in a state free from a tracking error.

10. An apparatus according to claim 9, wherein a diameter D of each of the first and second light spots satisfies a relation $D<(P_2-d)/2$.

11. An optical information recording/reproduction method for recording and/or reproducing information by irradiating an optical information recording medium with a light spot, said method comprising:

a step of irradiating different tracking tracks with first and second light spots for auto-tracking;

a first detection step of obtaining a first detection signal by detecting light of the first light spot via one of the tracking tracks;

a second detection step of obtaining a second detection signal by detecting light of the second light spot via one of the tracking tracks;

a generating step of generating a signal used for performing tracking control of a third light spot, interposed between the first and second light spots, which signal is used for recording or reproducing information, on the basis of a difference between the first and second detection signals; and an inverting step of inverting, upon recording information on or reproducing information from one of first and second recording media having different track pitches, $P_1$ and $P_2$, which satisfy a relation $P_1-P_2=2$ d, in which d is the width of a tracking track for each of the first and second recording media, while executing auto-tracking control, a relationship of a direction of movement of the third light spot in a track intersecting direction with respect to a polarity of a signal obtained by subtracting the second detection signal from the first detection signal between the first and second recording media.

12. A method according to claim 11, wherein the generating step comprises a subtraction step of subtracting the second detection signal from the first detection signal, and the inverting step comprises a polarity switching step of directly outputting an output obtained in the subtraction step when recording or reproduction is performed on one of the first and second recording media, and of inverting the polarity of an output obtained in the subtraction step and outputting the inverted output when recording or reproduction is performed on the other one of the first and second recording media.

13. A method according to claim 11, further comprising:

an input step of inputting information indicating whether a recording medium inserted in an optical information recording/reproduction apparatus is the first recording medium or the second recording medium, and wherein the inverting step comprises a step of determining the direction of movement of the third light spot in the track intersecting direction with respect to the polarity of the signal obtained by subtracting the second detection signal from the first detection signal in accordance with an instruction input in said input step.

14. A method according to claim 11, further comprising:

a discrimination step of discriminating whether a recording medium inserted in an optical information recording/reproduction apparatus is the first recording medium or the second recording medium; and a step of determining the direction of movement of the third light spot in the track intersecting direction with respect to the polarity of the signal obtained by subtracting the second detection signal from the first detection signal in accordance with a discrimination result obtained in said discrimination step.

15. A method according to claim 14, wherein said discrimination step comprises a track pitch detection step of detecting a track pitch of the recording medium, and discriminating the first recording medium or the second recording medium by detecting the track pitch.

16. A method according to claim 15, wherein said track pitch detection step detects the track pitch by detecting light obtained by causing the light spot to intersect across the track.

17. A method according to claim 16, wherein said track pitch detection step comprises detecting the track pitch when the recording medium is inserted in the apparatus.

18. A method according to claim 17, wherein an insertion direction of the recording medium in the apparatus is the track intersecting direction of the recording medium.

19. An auto-tracking device for performing auto-tracking control of a light spot used for recording information on and/or reproducing information from an optical information recording medium, said device comprising:
   first detection means and second detection means for detecting first and second light spots obtained via different tracking tracks of the recording medium, respectively; and
   means for inverting, upon recording information on or reproducing information from one of first and second recording media having different track pitches, $P_1$ and $P_2$, which satisfy a relation $P_1-P_2=2$ d, in which d is the width of a tracking track for each of the first and second recording media, while executing auto-tracking control, a relationship of a direction of movement of a third light spot, which is interposed between the first and second light spots, the movement direction being in a track intersecting direction with respect to a polarity of a signal obtained by subtracting a signal output from said second detection means from a signal output from said first detection means between the first and second recording media.

20. An optical information recording/reproduction apparatus for recording and/or reproducing information by irradiating an optical information recording medium with a light spot, said apparatus comprising:
   means for irradiating different tracking tracks with first and second light spots for auto-tracking;
   first detection means for obtaining a first detection signal by detecting light of the first light spot via one of the tracking tracks;
   second detection means for obtaining a second detection signal by detecting light of the second light spot via one of the tracking tracks; and
   means for generating a signal used for performing tracking control of a third light spot, interposed between the first and second light spots, which signal is used for recording or reproducing information, on the basis of a difference between the first and second detection signals,
   wherein said apparatus records information on or reproduces information from first and second recording media having different track pitches, $P_1$ and $P_2$, and the first and second recording media satisfy a relation $P_1-P_2=2$ d, in which d is the width of a tracking track for each of the first and second recording media.

21. An apparatus according to claim 20, further comprising means for inverting, upon recording information on or reproducing information from the first recording medium or the second recording medium while executing auto-tracking control, a relationship of a direction of movement of the third light spot in a track intersecting direction with respect to a polarity of a signal obtained by subtracting the second detection signal from the first detection signal between the first and second recording media.

22. An optical information recording/reproduction apparatus for recording and/or reproducing information by irradiating an optical information recording medium with a light spot, said apparatus comprising:
   means for irradiating different tracking tracks with first and second light spots for auto-tracking, respectively;
   first detection means for obtaining a first detection signal by detecting light of the first light spot via one of the tracking tracks;
   second detection means for obtaining a second detection signal by detecting light of the second light spot via one of the tracking tracks;
   generating means for generating a signal used for performing tracking control of a third light spot, which signal is used for recording or reproducing information, on the basis of a difference between the first and second detection signals;
   inverting means for inverting, upon recording information on or reproducing information from one of first and second recording media having different track pitches, $P_1$ and $P_2$, which satisfy a relation $P_1-P_2=2$ d in which d is the width of a tracking track for the first and second recording media, while executing auto-tracking control, a relationship of a direction of movement of the third light spot in a track intersecting direction with respect to a polarity of a signal obtained by subtracting the second detection signal from the first detection signal between the first and second recording media;
   discrimination means for discriminating whether a recording medium inserted in said optical information recording/reproduction apparatus is the first recording medium or the second recording medium, said discrimination means comprising track pitch detection means for detecting a track pitch of a recording medium, and discriminating the first recording medium or the second recording medium by detecting the track pitch, and
   wherein said apparatus determines the direction of movement of the third light spot in the track intersecting direction with respect to the polarity of the signal obtained by subtracting the second detection signal from the first detection signal in accordance with a discrimination result from said discrimination means.

23. An apparatus according to claim 22, wherein said track pitch detection means detects the track pitch by detecting light obtained by causing the light spot to intersect across the track.

24. An apparatus according to claim 23, wherein said track pitch detection means detects the track pitch when the recording medium is inserted in said apparatus.

25. An apparatus according to claim 24, wherein an insertion direction of the recording medium in said apparatus is the track intersecting direction of the recording medium.

26. An optical information recording/reproduction method for recording and/or reproducing information by irradiating an optical information recording medium with a light spot, said method comprising:
   a step of irradiating different tracking tracks with first and second light spots for auto-tracking;
   a first detection step of obtaining a first detection signal by detecting light of the first light spot via one of the tracking tracks;
   a second detection step of obtaining a second detection signal by detecting light of the second light spot via one of the tracking tracks;

a generating step of generating a signal used for performing tracking control of a third light spot, which signal is used for recording or reproducing information, on the basis of a difference between the first and second detection signals;

an inverting step of inverting, upon recording information or reproducing information from one of first and second recording media having different track pitches $P_1$ and $P_2$ which satisfy a relation $P_1-P_2=2$ d in which d is the width of a tracking track for the first and second recording media, while executing auto-tracking control, a relationship of a direction of movement of the third light spot in a track intersecting direction with respect to a polarity of a signal obtained by subtracting the second detection signal from the first detection signal between the first and second recording media;

a discrimination step of discriminating whether a recording medium inserted in an optical information recording/reproduction apparatus is the first recording medium or the second recording medium, said discrimination step comprising a track pitch detection step of detecting a track pitch of the recording medium, and discriminating the first recording medium or the second recording medium by detecting the track pitch; and a step of determining the direction of movement of the third light spot in the track intersecting direction with respect to the polarity of the signal obtained by subtracting the second detection signal from the first detection signal in accordance with a discrimination result obtained in said discrimination step.

27. A method according to claim 26, wherein said track pitch detection step detects the track pitch by detecting light obtained by causing the light spot to intersect across the track.

28. A method according to claim 27, wherein said track pitch detection step comprises detecting the track pitch when the recording medium is inserted in the apparatus.

29. A method according to claim 28, wherein an insertion direction of the recording medium in the apparatus is the track intersecting direction of the recording medium.

* * * * *

UNITED STATES PATENT AND TRADEMARK OFFICE
CERTIFICATE OF CORRECTION

PATENT NO. : 5,917,790

DATED : June 29, 1999

INVENTOR(S): SHINICHI OHTA, ET AL.

It is certified that error appears in the above-identified patent and that said Letters Patent is hereby corrected as shown below:

COLUMN 2,
Line 3, "2-2," should read --2-2,--;
Line 63, "p-polarized" should read --P-polarized--; and
Line 65, "p-polarized" should read --P-polarized--.

COLUMN 3,
Line 20, "s-polarized" should read --S-polarized--.

COLUMN 5,
Line 23, "medium" should read --medium.--; and
Line 53, "the" should read --a--.

COLUMN 9,
Line 58, "13B" should read --13B,--.

UNITED STATES PATENT AND TRADEMARK OFFICE
CERTIFICATE OF CORRECTION

PATENT NO. : 5,917,790

DATED : June 29, 1999

INVENTOR(S): SHINICHI OHTA, ET AL.

It is certified that error appears in the above-identified patent and that said Letters Patent is hereby corrected as shown below:

<u>COLUMN 10,</u>
Line 6, "system" should read --system.--.

Signed and Sealed this

Seventh Day of March, 2000

*Attest:*

*Attesting Officer*

Q. TODD DICKINSON

*Commissioner of Patents and Trademarks*